US005804716A

United States Patent [19]

McGuire et al.

[11] Patent Number: 5,804,716
[45] Date of Patent: Sep. 8, 1998

[54] APPARATUS AND METHOD FOR TESTING STANDPIPE FLOW

[76] Inventors: Mickey Richard McGuire, 25215 SE. 192nd, Maple Valley, Wash. 98038; Lon Howard Matthews, 45103 S.E. Edgewick Rd., North Bend, Wash. 98045; Keith Allen Hillstrom, 11021 Cramer Rd. KPN, Gig Harbor, Wash. 98329

[21] Appl. No.: 825,418

[22] Filed: Mar. 28, 1997

Related U.S. Application Data

[63] Continuation of Ser. No. 447,273, May 22, 1995, abandoned.

[51] Int. Cl.[6] .............. G01F 15/02
[52] U.S. Cl. .............. 73/198
[58] Field of Search .............. 414/430, 284

[56] References Cited

U.S. PATENT DOCUMENTS

| | | | |
|---|---|---|---|
| 4,285,245 | 8/1981 | Kennedy | 73/861 |
| 4,741,361 | 5/1988 | McHugh | 137/559 |
| 4,919,289 | 4/1990 | Bartis | 220/1 B |
| 4,945,491 | 7/1990 | Rishel | 364/510 |
| 4,979,571 | 12/1990 | MacDonald | 169/44 |
| 5,018,386 | 5/1991 | Zeoli | 73/168 |
| 5,121,639 | 6/1992 | McShane . | |
| 5,182,951 | 2/1993 | Jorritsma | 73/861 |
| 5,363,510 | 11/1994 | Chlebek | 4/321 |
| 5,465,874 | 11/1995 | Roach et al. | 222/51 |

*Primary Examiner*—George M. Dombroske
*Assistant Examiner*—Jewel Thompson
*Attorney, Agent, or Firm*—Christensen O'Connor Johnson and Kindness

[57] ABSTRACT

An apparatus for measuring the flow rate and pressure of water discharged from a standpipe valve includes a portable tank (10) mounted on wheels (24). A pipe assembly (40), includes a pressure gauge 48), a flow meter (46) and a shut-off valve (44) mounted in series on the tank (40) in fluid flow communication with the tank. A high pressure hose (52) is used to connect the inlet of the pipe assembly (40) to the valve being tested.

13 Claims, 1 Drawing Sheet

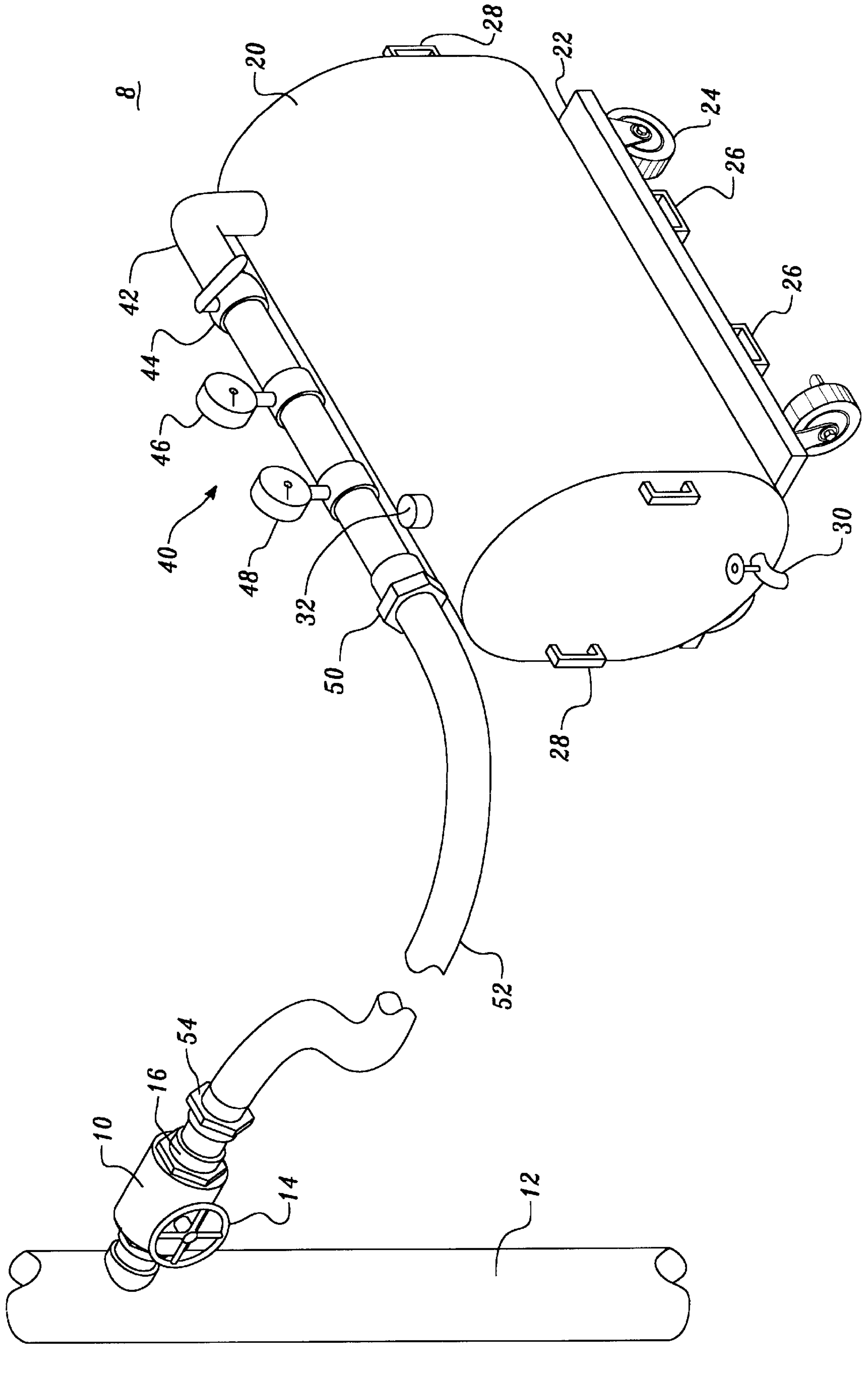
8
20
28
22
24
26
26
42
44
46
40
48
32
50
30
28
52
54
16
10
14
12

APPARATUS AND METHOD FOR TESTING STANDPIPE FLOW

This application is a continuation application of application Ser. No. 08/447,273, filed on May 22, 1995, now abandoned.

FIELD OF THE INVENTION

The present invention relates to an apparatus and method for testing fluid flow rates and pressure and, in particular, to testing liquid flow through standard and pressure reducing valves connected to a standpipe.

BACKGROUND OF THE INVENTION

Modern building codes require that a water source be available to which a fire hose can be connected if a need for water should arise, for instance, to fight a fire or address other emergencies. In high rise buildings, a connection for a fire hose is typically required at each floor of the building, thereby requiring a water standpiping system extending the full height of the building. Building and/or fire codes specify that the water available at each floor of the building must be within a maximum and minimum pressure, as well as above a minimum flow rate. For instance, building codes typically require water availability at a pressure from 125 to 175 psi and a minimum flow rate of 300 gallons per minute. To maintain this uniform level of water pressure along the height of a standpipe system in tall buildings, pressure reducing valves must be used in the lower elevations of the building because the pressure in the standpipe may exceed 400 psi. If a fire hose were connected to water at this high pressure, the hose likely would burst.

The flow rate and water pressure at the hose valves along the height of the standpipe system must be periodically tested. Heretofore, this testing typically has been carried out by attaching a short piece of pipe to the valve outlet. A pressure gauge and flow meter are connected in fluid flow communication to the pipe section to measure the pressure and water flow rate when the hose valve is opened. A fire hose is attached to the discharge end of pipe section to direct the water from the valve to a high capacity drain or to atmosphere. Testing hose valves in this manner is inconvenient and time-consuming.

Often, high capacity drains are only available in the basement of a building, and thus, an extremely long runs of fire hoses must be used to test the valves. The flow resistance imparted by the fire hose may result in erroneous pressure and flow readings during the testing process. Also, laying the fire hose from the basement drain to each of the standpipe valves along the entire height of a building is very time-consuming. Further in completed buildings, it is not practical to simply discharge the water flow to atmosphere, as might be possible when a building is under construction, assuming that equipment, construction workers, pedestrians, vehicular traffic, etc., are not detrimentally impacted by the stream of water being discharged, which can be several hundred gallons per minute.

The present invention seeks to address the above-noted drawbacks of using current methods and equipment for testing the pressure and flow from standpipe hose valves.

SUMMARY OF THE INVENTION

The invention provides an apparatus for testing the pressure and flow rate of water available at a fire control system, including along the elevation of a standpipe system of a high rise building. The apparatus includes a portable tank that may be readily rolled to the locations at which the water flow rate of the fire control system are being tested. The tank is of sufficient size to receive the water flow from the fire control system for a sufficient length of time to test the flow rate and pressure of the water during steady state flow.

A flow line is used to direct the water from the fire control system being tested to the portable tank. A flow meter and pressure gauge are in fluid flow communication with the water flowing through the flow line so as to measure the flow rate and pressure of the water. Ideally, the flow line includes a length of high pressure hose so that the tank need not be in any particular location relative to the fire control system being tested.

Once filled, the portable tank can be wheeled to a drain location and emptied. Thereafter, the tank is simply rolled to the next test location.

BRIEF DESCRIPTION OF THE DRAWINGS

The foregoing aspects and many of the attendant advantages of this invention will be more readily appreciated as the invention becomes better understood by reference to the following detailed description, when taken in conjunction with the accompanying drawing, wherein:

FIG. 1 is an isometric view of an exemplary embodiment of an apparatus for testing the water pressure and flow rate at standpipe hose valves in accordance with the present invention.

DETAILED DESCRIPTION OF THE PREFERRED EMBODIMENT

FIG. 1 illustrates an exemplary embodiment of an apparatus 8 constructed in accordance with the present invention for testing a standpipe hose valve. A pressure reducing valve 10 is illustrated as extending horizontally from a vertical standpipe 12, which may form part of a standpipe system of a typical high-rise building. The pressure reducing valve 10 may be of various standard types. The valve 10 may be adjustable to regulate the pressure of the water discharged from the valve when the valve is opened by rotation of valve wheel 14. The valve may be designed to be open and shut by other manually operable methods, such as by rotation of lever, not shown. An outlet nipple 16 projects from the valve 10. The nipple is threaded to receive a standard quick disconnect coupling of the type typically used at the end of a fire hose.

The heretofore described components do not form part of the present invention, but have been included to provide a better understanding of the construction and operation of the present invention. In one preferred embodiment of the present invention, the apparatus 8 includes a portable water tank 20 for holding the water discharged from the valve 10 during the testing of the valve. The portable tank 20 is mounted on a platform 22 supported by wheels 24. The wheels 24, at least at one end of the platform, ideally swivel to enable the tank to be readily steered during travel. Rather than utilizing a bed 22, wheels 24 may be mounted directly to the tank 20. In this regard, it may be necessary to utilize mounting brackets, not shown, between the tank and the wheels.

Preferably, the tank includes handles 28 that may be used to push, pull, and steer the tank, for instance, down the hallway or corridor of a building, so that the tank may be wheeled to a position adjacent the valve being tested. The tank also includes an outlet spigot 30 for emptying of the tank. The spigot 30 may be replaced with a ball valve or other type of valve for rapid opening and closing, as desired.

The tank 20 also preferably includes at least one vent 32 to allow air in the tank to escape as the tank is being filled with water from the valve 10 and also to allow air to enter the tank as the water in the tank drains out through spigot 30.

Ideally, the tank 20 is of sufficient size to test at least two valves 10 before having to empty the tank. Applicants have found that a tank having a capacity of from 250 to 300 gallons is sufficient to enable at least two valves to be tested before the tank is full. Of course, the size of the tank can be decreased or increased depending on other factors, such as the size of corridors or passageways along which the tank must be rolled to be placed in position next to the valve being tested and also the desired number of valves to be tested before the tank has to be emptied. Further, although tank 20 is shown in FIG. 1 as being disposed in horizontal orientation, the tank could be disposed vertically so as to have a smaller footprint. Also, rather than being oval in cross-section, the tank can be constructed in other cross-sectional shapes, such as circular or rectangular.

Preferably, a pair of pockets or sleeves 26 are mounted beneath bed 22. Ideally, the sleeves 26 are sized to receive the forks of a forklift. As will be appreciated, it may be desirable to use a forklift or similar equipment to lift the tank 20 onto a transport vehicle or unload the tank from the transport vehicle, or to otherwise carry the tank 20 over a substantial distance, rather than rolling the tank on its wheels.

A pipe assembly 40 is mounted along the top of the tank 20, and is in fluid flow communication with the tank. The pipe assembly includes an elbow 42 extending upwardly from the top of the tank, and then horizontally along the tank, a shut-off valve 44 is positioned at the entrance to the elbow to control the water flow through the pipe assembly 40 and into the tank 20. A flow meter 46 and a pressure meter 48 are positioned along the length of the pipe assembly to measure both the pressure of the water discharged from valve 10, and also the flow rate of the water. Both the flow meter and pressure gauge may be of numerous commercially available types.

A coupling 50 is provided at the end of the pipe assembly 40 to connect a high pressure line or hose 52 to the pipe assembly. The opposite end of the hose includes a coupling 54 to connect the hose to the outlet nipple 16 of the valve 10. It will be appreciated that by use of the hose 52, the tank need not be positioned at a specific orientation relative to the valve 10, which would be the case if rigid pipe were used to couple the valve to the tank.

Although ideally the pipe assembly 40 is securely mounted to the tank 20, the pipe assembly instead may be connected directly to the valve 10 and a length of hose utilized between the pipe assembly and the tank 20 to direct the water flow from the pipe assembly into the tank.

To describe the use of the present invention, the tank 20 is wheeled to a position adjacent the hose valve 10 to be tested. The hose 52 is interconnected between the pipe assembly 40 and the outlet nipple of the valve 10. With the shut-off valve 44 in nominally closed position, the valve 10 to be tested is slowly opened, which should cause the pump employed at the building for pressurizing the standpipe 12 to begin operation. Thereafter, the valve 44 is slowly opened until the flow gauge 46 reaches a desired flow rate. Thereupon, both the flow rate from gauge 46 and the pressure from gauge 48 are recorded. Thereafter, the valve 44 is slowly closed, and then the pressure gauge 48 recorded, which corresponds to the static pressure at valve 10. Thereafter, the valve 10 is closed and the valve 44 reopened to drain the water in the hose 52 and pipe assembly 40. The hose 52 is then conveniently disconnected from nipple 16 and the tank 20 simply wheeled to the next valve to be tested. Eventually, when the tank 20 becomes full, it will be necessary to wheel the tank to an appropriate drain location so that the tank can be emptied by opening spigot valve 30.

It will be appreciated that if valve 10 is out of adjustment so that the discharge pressure at the valve is either too high or too low, the valve can be adjusted, repaired and conveniently retested. It is not necessary to remove the valve 10 from the standpipe 12 to take it to a shop at a remote location for adjustment or repair.

It will also be appreciated that shut-off valves, not shown, can be interposed between flow pipe 40 and gauges 46 and 48 to protect the gauges from pressure spikes that might occur as the valves 44 and 10 are being opened or closed.

During initial water flow from valve 10, frequently air bubbles will be present in the water stream. To obtain an accurate reading, it is important that sufficient water flow occur so that the air bubbles are no longer present. To this end, a length of clear or translucent piping, not shown, may be interposed in pipe assembly 40 so that the presence of air bubbles may be visually monitored by the operator.

While preferred embodiments of the present invention have been described, it will be appreciated that various changes can be made therein without departing from the spirit or scope of the present invention. For instance, the present invention may be utilized to test values that do not have pressure reducing capabilities, such as values of the upper levels of a high rise building. Also, the present invention can be used to test the pressure and flow rate of water supplied to a sprinkler system.

The embodiments of the invention in which an exclusive property or privilege is claimed are defined as follows:

1. An apparatus for testing the flow rate of water available at a fire control system of a multi-story building, comprising:

a portable tank of a size sufficient to receive the water flow from the fire control system for a sufficient length of time to test the steady state water rate discharged from the fire control system, the portable tank comprising support means for manually rolling the tank from location to location within the multi-store building without having to lift the tank, the support means having a plurality of wheels secured thereto, the tank together with the support means being of size to be manually rolled from location to location through corridors or passageways within the multi-story building;

a flow line to direct water from the fire control system being tested to the portable tank; and a pipe assembly comprising a flow meter and pressure gauge, the pipe assembly connectable in fluid flow communication with the flow line and the portable tank to measure the flow rate and pressure of the water discharged from the fire control system being tested, the pipe assembly being mounted on the tank.

2. The apparatus according to claim 1, wherein the pipe assembly has an outlet and the tank has an inlet, with the outlet of the pipe assembly and the inlet of the tank rigidly connectable together.

3. The apparatus according to claim 2, wherein:

the pipe assembly has an inlet connectable to the outlet end of the flow line; and the inlet end of the flow line disposable in fluid flow communication with the fire control system being tested.

4. An apparatus for testing the flow rate of water available for fire control as discharged from a valve connected to a water standpipe system of a multi-story building, comprising:

a portable tank of a size sufficient to receive the water flow from the valve for an adequate length of time to test the steady state flow of water discharged from the valve, the tank supported by wheels for rolling the tank and the tank being of a size to be manually rolled from location to location within the multi-story building, the tank having a discharge opening at the lower portion of the tank to drain the water accumulated in the tank during a test of water discharge from the standpipe valve;

a flow line to direct water for fire control discharged from the valve being tested to the portable tank;

a flow meter in fluid flow communication with the water flowing from the valve to the portable tank to measure the level of water flow for fire control discharged from the valve; and a pressure meter in fluid flow communication with the water flowing from the valve being tested to the portable tank to measure the pressure of the water available for fire control discharged from the valve, wherein the flow meter and pressure meter are mounted on the portable tank.

5. The apparatus according to claim 4, further comprising a shut-off valve in fluid flow communication with the water discharged from the valve and flowing to the tank, the shut-off valve being located downstream from the flow meter and pressure gauge and upstream from the portable tank.

6. The apparatus according to claim 5, wherein the flow meter, pressure gauge and shut-off valve are interconnected together as a pipe assembly.

7. The apparatus according to claim 2, wherein the inlet of the tank is in communication with substantially the entire interior volume of the tank.

8. The apparatus according to claim 7, wherein the tank has a capacity of about 250 gallons to about 300 gallons.

9. The apparatus according to claim 1, wherein the tank includes an outlet opening in a lower portion of the tank for emptying the water accumulated within the tank by gravity.

10. The apparatus according to claim 9, further comprising an air vent in communication with an upper portion of the tank, the air vent permitting air to escape from the interior of the tank during the filling of the tank with water during the testing of a fire control system and permitting air to enter the tank during the draining of the accumulated water from the tank.

11. The apparatus according to claim 4, wherein the portable tank further including an inlet in water flow communication with the flow meter and the pressure gauge, the inlet being in communication with substantially the entire interior volume of the portable tank.

12. The apparatus according to claim 11, wherein the volumetric capacity of the tank being in the range from about 250–300 gallons.

13. The apparatus according to claim 4, further comprising an air vent disposed in the upper portion of the tank to permit air from being expelled from the tank when water discharged from the valve being tested flows into the tank and to permit air from entering the tank when the water collected within the tank is being discharged through the discharge opening of the tank.

* * * * *

UNITED STATES PATENT AND TRADEMARK OFFICE
CERTIFICATE OF CORRECTION

PATENT NO. : 5,804,716
DATED : September 8, 1998
INVENTOR(S) : M.R. McGuire et al.

It is certified that error appears in the above-identified patent and that said Letters Patent is hereby corrected as shown below:

Title page,
*Assistant Examiner*, "Jewel Thompson" should read -- Jewel Artis-Thompson --
ABSTRACT, line 4, before "48)" please insert -- ( --

Column 4,
Line 44, "multi-store" should read -- multi-story --

Signed and Sealed this

Twenty-third Day of April, 2002

*Attest:*

JAMES E. ROGAN

*Attesting Officer*

*Director of the United States Patent and Trademark Office*